(12) United States Patent
Dietel

(10) Patent No.: US 10,797,281 B2
(45) Date of Patent: Oct. 6, 2020

(54) HAND-HELD POWER TOOL AND RECHARGEABLE BATTERY PACK FOR A HAND-HELD POWER TOOL

(71) Applicant: Robert Bosch GmbH, Stuttgart (DE)

(72) Inventor: Juergen Dietel, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 3 days.

(21) Appl. No.: 16/091,299

(22) PCT Filed: Mar. 29, 2017

(86) PCT No.: PCT/EP2017/057430
§ 371 (c)(1),
(2) Date: Oct. 4, 2018

(87) PCT Pub. No.: WO2017/174419
PCT Pub. Date: Oct. 12, 2017

(65) Prior Publication Data
US 2019/0123314 A1 Apr. 25, 2019

(30) Foreign Application Priority Data
Apr. 5, 2016 (DE) .......................... 10 2016 205 568

(51) Int. Cl.
*H01M 2/10* (2006.01)
*H01M 10/46* (2006.01)
(Continued)

(52) U.S. Cl.
CPC ............ *H01M 2/1055* (2013.01); *B25F 5/00* (2013.01); *B25F 5/02* (2013.01); *H01M 10/46* (2013.01);
(Continued)

(58) Field of Classification Search
USPC ....................................................... 320/112
See application file for complete search history.

(56) References Cited

U.S. PATENT DOCUMENTS 5,227,262 A 7/1993 Ozer
6,729,415 B1 5/2004 Huang
(Continued)

FOREIGN PATENT DOCUMENTS

DE 102015201574 10/2015
EP 2944432 11/2015
(Continued)

OTHER PUBLICATIONS

International Search Report dated Jun. 19, 2017 of the corresponding International Application PCT/EP2017/057430 filed Mar. 29, 2017.

*Primary Examiner* — Mohammed Alam
(74) *Attorney, Agent, or Firm* — Norton Rose Fulbright US LLP; Gerard Messina

(57) ABSTRACT

A rechargeable battery pack for a hand-held power tool, including a rechargeable battery pack housing, the rechargeable battery pack housing accommodating at least two rechargeable battery cells. The rechargeable battery pack is mechanically and electrically connectable to a hand-held power tool and/or to a charging device via an interface. The interface includes contact elements for electrically and/or mechanically contacting corresponding countercontact elements on the hand-held power tool and/or corresponding countercontact elements on the charging device. It is provided that the rechargeable battery pack housing includes at least one first rechargeable battery cell string for accommodating at least one first rechargeable battery cell, and at least one second rechargeable battery cell string for accommodating at least one second rechargeable battery cell. The rechargeable battery pack housing includes at least two electrical contact elements for each rechargeable battery cell string.

20 Claims, 3 Drawing Sheets

(51) Int. Cl.
*H02J 7/00* (2006.01)
*B25F 5/00* (2006.01)
*B25F 5/02* (2006.01)

(52) U.S. Cl.
CPC .......... *H02J 7/0013* (2013.01); *H02J 7/0045* (2013.01); *H01M 2220/30* (2013.01)

(56) References Cited

U.S. PATENT DOCUMENTS

| | | | | |
|---|---|---|---|---|
| 2008/0012526 | A1* | 1/2008 | Sadow | B25F 5/00 320/111 |
| 2011/0198103 | A1* | 8/2011 | Suzuki | B25F 5/00 173/46 |
| 2015/0042280 | A1* | 2/2015 | Rief | H02J 7/0047 320/113 |
| 2015/0332839 | A1* | 11/2015 | Stock | H01F 3/08 320/108 |
| 2016/0072106 | A1* | 3/2016 | Baumgartner | H01M 10/46 320/113 |

FOREIGN PATENT DOCUMENTS

| | | |
|---|---|---|
| WO | 2009/033865 | 3/2009 |
| WO | 2015132606 A1 | 9/2015 |

* cited by examiner

HAND-HELD POWER TOOL AND RECHARGEABLE BATTERY PACK FOR A HAND-HELD POWER TOOL

FIELD OF THE INVENTION

The present invention relates to a rechargeable battery pack for a hand-held power tool according to claim 1, and a hand-held power tool according to claim 10.

BACKGROUND INFORMATION

Electric hand-held power tools are basically believed to be understood, and are supplied with power via a mains connection. Alternatively, rechargeable battery devices allow high flexibility during operation, since in particular they are independent of mains electric power. Thus, for example, outdoor work may also be conveniently carried out, so that provision is often made for using rechargeable battery packs during operation of a hand-held power tool.

These types of rechargeable battery packs are basically known, and generally include a plurality of rechargeable batteries connected in parallel and/or in series, for example three cylindrical Li-ion cells, each with 3.6 V with a total voltage of 10.8 V, connected in series. The connected rechargeable battery cells must be connected on the one hand to a rechargeable battery pack electronics system, and on the other hand to one another. The rechargeable battery pack generally includes a rechargeable battery pack housing in which the rechargeable battery cells are either completely or partially accommodated, which may be with the aid of a cell holder. Alternatively, the cell holder itself forms a rechargeable battery pack housing element of the rechargeable battery pack housing.

Within the scope of the present patent application, a rechargeable battery pack is thus understood to mean a rechargeable battery pack, which may be made up of multiple electrically interconnected rechargeable battery cells, that may store electrical energy and that supply the energy required for operating a hand-held power tool, and that is replaceably mountable in a chamber, an interface, or the like of the hand-held power tool. In particular, an interface is understood to mean a device that is provided for directly or indirectly establishing an electrical and in particular a mechanical connection with a charging device and/or a discharge side, i.e., the hand-held power tool.

Coupling the rechargeable battery pack to the hand-held power tool takes place by inserting or sliding the interface of the rechargeable battery pack into a complementary plug-in socket of the device housing. The interface includes contact slots in which contact elements may be situated. When the energy of the rechargeable battery pack is depleted, it may be removed and connected to a charging station with corresponding countercontact elements. If multiple rechargeable battery packs are available, it is thus possible to remove the discharged rechargeable battery pack from the hand-held power tool and replace it with a charged rechargeable battery pack. The nominal voltage and capacity of the particular rechargeable battery pack used generally determine the power and run time of the hand-held power tools.

It is believed to be understood from the related art that rechargeable battery packs may be identified by encoding with respect to the charging device and the hand-held power tool, so that other rechargeable battery packs that are not provided for the hand-held power tool, for example those with a different nominal voltage, are not accepted by the hand-held power tool in order to prevent damage to the rechargeable battery pack and/or the hand-held power tool.

In addition, it is believed to be understood that various hand-held power tools of a voltage class include mutually incompatible rechargeable battery packs, whereas the rechargeable battery packs of various hand-held power tools within a voltage class, for example a baton screwdriver, a cordless drill, a percussion drill, a jigsaw, a multifunctional tool, and/or a combi drill, are often compatible.

The rechargeable battery packs as well as the hand-held power tools and charging devices, and thus the respective interfaces, are undergoing continual improvement, it being common to implement additional contact elements and countercontact elements in the interfaces in order to exchange additional information between the devices. For reasons of manageability and usability of the rechargeable battery pack and the hand-held power tool, it is desirable to keep the installation space that is required for the interface as compact as possible. In addition, for reasons of compatibility with predecessor models, there may also be the requirement to change the geometry of the interface as little as possible compared to a predecessor model.

It has basically proven to be disadvantageous that the hand-held power tools offered by manufacturers are generally each provided with different rechargeable battery packs, the rechargeable battery packs having different sizes and/or nominal voltages, and each rechargeable battery pack being associated with a specific type of hand-held power tool with regard to the power and the geometry of the locking elements and contact elements. The usability of such a rechargeable battery pack is relatively inflexible, since the use of each rechargeable battery pack is limited to a specific type of hand-held power tool.

SUMMARY OF THE INVENTION

An object of the present invention is to avoid the disadvantages described above and to provide an improved rechargeable battery pack of the type stated at the outset, which is usable in a variety of different hand-held power tools.

This object is achieved by a rechargeable battery pack according to the descriptions herein. Advantageous embodiments, variants, and refinements of the present invention are set forth in the further descriptions herein.

According to the present invention, it is provided that a rechargeable battery pack for a hand-held power tool includes a rechargeable battery pack housing, the rechargeable battery pack housing accommodating at least two rechargeable battery cells. The rechargeable battery pack is mechanically and electrically connectable to a hand-held power tool and/or a charging device via an interface, the interface including contact elements for electrically and/or mechanically contacting corresponding countercontact elements on the hand-held power tool and/or corresponding countercontact elements on the charging device. According to the present invention, it is provided that the rechargeable battery pack housing includes at least one first rechargeable battery cell string for accommodating at least one first rechargeable battery cell, and at least one second rechargeable battery cell string for accommodating at least one second rechargeable battery cell, the rechargeable battery pack housing including at least two electrical contact elements for each rechargeable battery cell string. The advantage of the present invention, among other things, is that a rechargeable battery pack according to the present invention no longer has a fixed voltage class, and may operate in at least two different voltage classes, for example 18 V and 36 V, by a series and/or parallel connection of at least two rechargeable battery cell strings. With the aid of a 36 V rechargeable battery pack that is present, the operator may also operate an 18 V hand-held power tool, and may thus dispense with the expenditure for an 18 V rechargeable battery pack and a corresponding charging device. In addition, the present invention allows provision of a rechargeable battery pack for operating various hand-held power tools having different operating voltages, so that the operator may operate a hand-held power tool with the aid of a rechargeable battery pack according to the present invention, even though the original rechargeable battery pack is possibly defective or discharged. It is advantageous that it is not necessary to use two different charging devices or carry them to a construction site.

The first rechargeable battery cell string and the second rechargeable battery cell string are advantageously situated within the rechargeable battery pack housing with electrical insulation from one another. In one particular specific embodiment, the first rechargeable battery cell string and the second rechargeable battery cell string each include multiple rechargeable battery cells, which may be five rechargeable battery cells, which may particularly be ten rechargeable battery cells, that are electroconductively connected to one another in series. It is advantageous when the first rechargeable battery cell string and the second rechargeable battery cell string each accommodate the same number of rechargeable battery cells.

When a rechargeable battery pack is inserted, the first rechargeable battery cell string and the second rechargeable battery cell string may be electroconductively connected to one another in a parallel or series connection in such a way that the voltage required by the hand-held power tool is present. The nominal voltage to be provided is a multiple of the respective voltages of the first rechargeable battery cell string and of the second rechargeable battery cell string. Thus, for example, hand-held power tools that are provided for operation using a slightly lower-power rechargeable battery pack may alternatively now be operated with a higher-power rechargeable battery pack, as the result of which a rechargeable battery pack according to the present invention allows an extended run time of the hand-held power tool.

The number of contact elements of the interface of the rechargeable battery pack may correspond to the number of countercontact elements of the interface of the hand-held power tool. Rechargeable battery packs may thus be mechanically and electrically connected to various hand-held power tools via the interface, even though they may differ in their required nominal voltage, capacity, and/or operating voltage.

In addition, rechargeable battery packs may thus be used which originally were not provided for operation of the hand-held power tool, but by use of which the hand-held power tool may be operated due to the variable nominal voltage and capacity.

In one specific embodiment of the present invention, the rechargeable battery pack housing includes at least one cell holder for accommodating the at least one first rechargeable battery cell string and/or the at least one second rechargeable battery cell string, the cell holder advantageously directly forming the at least one first rechargeable battery cell string and/or the at least one second rechargeable battery cell string.

In principle, various specific embodiments of a cell holder may be used within the rechargeable battery pack, so that rechargeable battery cells having different diameters and lengths may be accommodated, and use of the cell holder in different rechargeable battery packs may be ensured.

Various types of rechargeable batteries that include different materials, for example lithium-ion (Li-ion), nickel-cadmium (NiCd), nickel-metal hydride (NiMH), or lithium-polymer (LiPo), different structural shapes, for example round, prismatic, or angular shapes, or other alternative systems, for example fuel cells, may be used as rechargeable battery cells for a rechargeable battery pack. In particular lithium-ion cells may be used, since in particular for lithium-ion cells it is possible to combine multiple rechargeable battery cells into rechargeable battery cell blocks in which multiple rechargeable battery cells are connected in parallel and/or in series. It is particularly advantageous that the cell holder may accommodate rechargeable battery cells having different diameters and lengths, so that the cell holder or the cell carrier may be used in different rechargeable battery packs.

The rechargeable battery pack according to the present invention may also be provided in a tool system. Accordingly, a further subject matter of the present invention relates to a hand-held power tool that includes a rechargeable battery pack that is detachably connectable to the hand-held power tool, the hand-power tool including a housing with a drive motor, situated in the housing, for driving a mechanical interface, and a first electronics system situated in the housing. In addition, the hand-held power tool includes a rechargeable battery pack that is detachably connectable to the hand-held power tool, and an interface with corresponding countercontact elements for electrically and/or mechanically contacting the contact elements of the interface of the rechargeable battery pack.

The interface includes at least four electrical countercontact elements, the countercontact elements being wired to one another in such a way that the drive motor is supplied with the required voltage when a rechargeable battery pack is inserted. It is particularly advantageous when the number of countercontact elements of the interface of the hand-held power tool corresponds to the number of contact elements of the interface of the rechargeable battery pack.

In one specific embodiment, the operating voltage of the hand-held power tool corresponds to a multiple of the voltage provided by at least one rechargeable battery cell string, the electrical countercontact elements being connected to one another in such a way that the drive motor is supplied with the required voltage when a rechargeable battery pack is inserted. It is advantageous that the hand-held power tool includes at least one electronics system that allows recognition and/or control of the rechargeable battery pack that is coupled via the interface of the hand-held power tool.

In one embodiment variant of the present invention, a first countercontact element of the hand-held power tool is connected to a third countercontact element of the hand-held power tool, and/or a second countercontact element of the hand-held power tool is connected to a fourth countercontact element of the hand-held power tool, when a rechargeable battery pack is inserted, the drive motor being connected to the first and the third countercontact elements and/or to the second and the fourth countercontact elements via an electronics system.

In one alternative embodiment variant of the present invention, the second countercontact element of the hand-held power tool is connected to the third countercontact element of the hand-held power tool when a rechargeable battery pack is inserted, the drive motor being connected to the first and the fourth countercontact elements via an electronics system.

A hand-held power tool is generally understood to mean all hand-held power tools that include a tool carrier which may be set in motion, for example in rotation and/or vibration, and which is drivable by a drive motor, for example baton screwdrivers, cordless drills, percussion drills, multifunction tools, and/or combi drills. In this context, transmission of electrical energy is understood in particular to mean that the hand-held power tool is supplied with energy via a rechargeable battery pack and/or via a power cable connection.

The rechargeable battery pack according to the present invention may also be provided in a tool system. Accordingly, a further subject matter of the present invention relates to a charging device for charging a rechargeable battery pack. The charging device includes an interface with countercontact elements for electrically and/or mechanically contacting the contact elements of the rechargeable battery pack, the interface including at least four electrical countercontact elements that are directly wired to one another in such a way that all rechargeable battery cells in the rechargeable battery cell strings are charged when the rechargeable battery pack is electrically connected to the charging device.

The number of countercontact elements of the interface of the charging device advantageously corresponds to the number of contact elements of the interface of the rechargeable battery pack.

A drive motor is generally understood to mean all types of electrical consumers, such as an EC motor, a linear drive, a lamp, a pump, a fan, a compressor, or the like. The advantage of the brushless EC motors, among other things, is that on the one hand they are virtually maintenance-free, and due to their high efficiency allow a longer run time per rechargeable battery charge during operation of a rechargeable battery, as the result of which they are particularly efficient. On the other hand, hand-held power tools that include EC motors are very compact and lightweight, it being particularly advantageous that less heat loss occurs, so that the devices do not become as hot as comparable devices, and therefore have a longer life.

Further features, application options, and advantages of the present invention result from the following description of the exemplary embodiments of the present invention illustrated in the figures. It is pointed out that the illustrated features are only descriptive in nature, and may also be used in combination with features of other refinements described above, and are not intended to limit the present invention in any way.

The present invention is described in greater detail below with reference to the appended figures, the same reference numerals being used for identical features.

DETAILED DESCRIPTION

Figure 1:
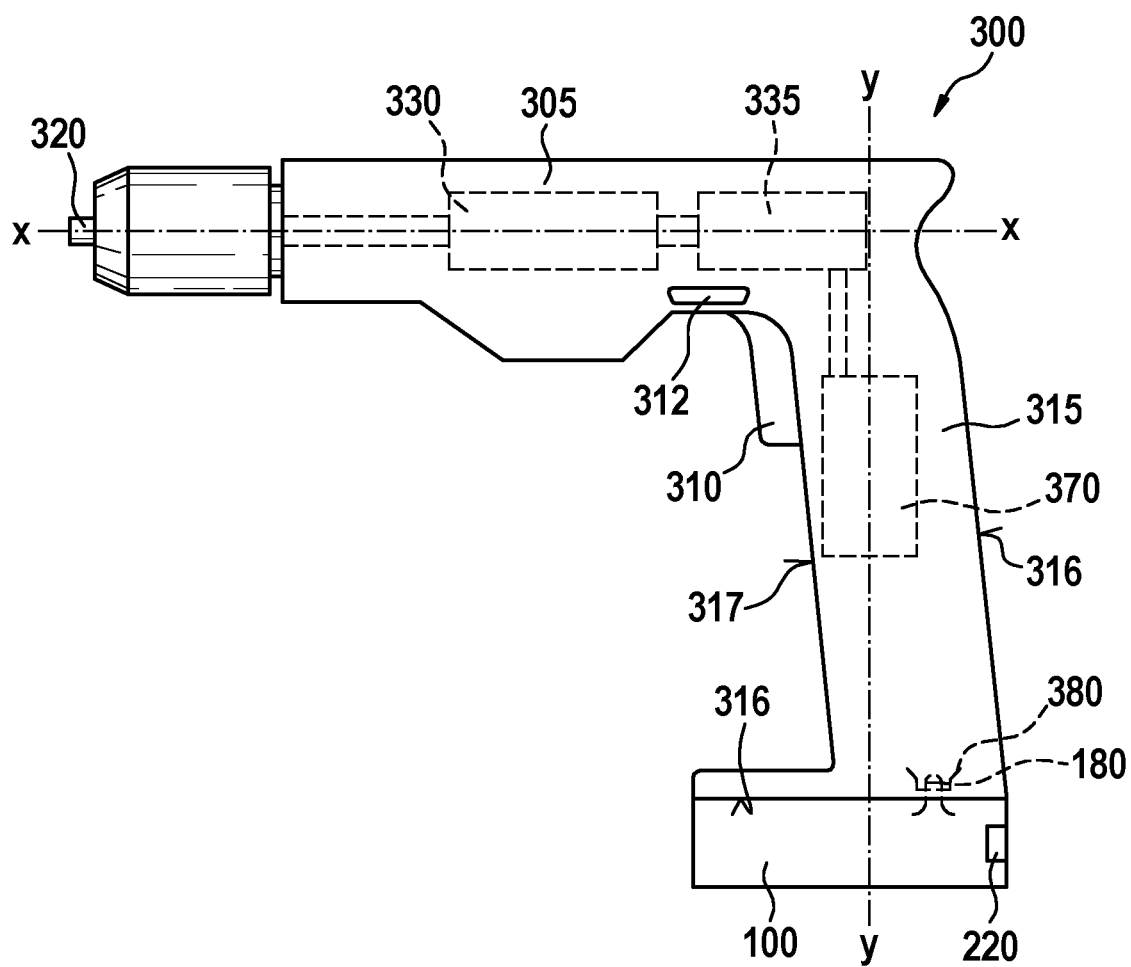
FIG. 1 shows by way of example a view of a hand-held power tool together with a rechargeable battery pack according to the present invention.

FIG. 1 shows an electrical device configured as a hand-held power tool 300, which by way of example is configured as a cordless combi drill. Accordingly, in the illustrated specific embodiment, hand-held power tool 300 is mechanically and electrically connected to a rechargeable battery pack 100 for off-the-grid power supply. However, it is pointed out that the present invention is not limited to cordless combi drills, and instead may be used for other hand-held power tools 300. Hand-held power tool 300 includes a gear 330, situated in a housing 305, for transmitting a torque that is generated by a drive motor 335 to a drive shaft which rotates about an axis x and on which a tool holder 320 for a tool (not illustrated) is fastened, and a handle 315. An electronics system 370 that is in electronic and/or mechanical contact with drive motor 335 and/or gear 330 is situated within housing 305. Handle 315 is used as a support surface for a hand of an operator of hand-held power tool 300, and generally has a longitudinal axis y, a front side 317 that points in the direction of tool holder 320 along an axis x, a rear side 316, and two side faces 318.

A first control element 310 for supplying energy to drive motor 335 is situated in the area of handle 315, first control element 310 protruding from housing 305 for manual access by the user, so that, by a pushing movement of first control element 310, the drive motor may be controlled and/or regulated in a manner known per se, which may be as a function of the displacement travel of first control element 310, and also the power supply to drive motor 335 may be switched on and/or off. In addition, hand-held power tool 300 includes a second control element 312 in the form of a slide switch for setting the rotational direction of drive motor 335 of hand-held power tool 300. Second control element 312 is situated so as to be displaceable perpendicularly with respect to rotational axis x of the drive shaft, in particular of tool holder 320 of hand-held power tool 300, so that when actuated, second control element 312 may be moved back and forth between a first position, a second position, and a third position. The first position and the second position each determine a rotational direction of the drive motor. Thus, based just on the positions of second control element 312, the user of hand-held power tool 300 may recognize which operating mode hand-held power tool 300 is operating in. In addition, the second switching element has a third position, for example a middle position, between the first position and the second position, an electrical, electromechanical, and/or mechanical interruption of the motor current taking place in the third position. Thus, for example, the operation of first switching element 310 may be mechanically blocked, second control element 312 having a locking effect on first switching element 310 when moved into a third position. Second control element 312, as illustrated, may be configured as a slide switch or alternatively as a toggle switch.

First control element 310 and second control element 312 are situated along rotational axis x in such a way that it is possible to actuate first as well as second control elements 310, 312 with the index finger or middle finger. The distance between first control element 310 and second control element 312 is selected in such a way that operation of hand-held power tool 300 with one hand is possible. In addition, both control elements 310, 312 are situated in an area below rotational axis x, and protrude from housing 305.

In the position shown in FIG. 1, rechargeable battery pack 100 is fastened to handle 315 of hand-held power tool 300 and locked by a locking arrangement. The operation of hand-held power tool 300 is not impaired by situating rechargeable battery pack 100 beneath handle 315. The locking arrangement (not illustrated in greater detail) include, among other things, a locking element and an actuating element 220. Rechargeable battery pack 100 may be removed from handle 315 of hand-held power tool 300 by actuating actuating arrangement 220. In addition, hand-held power tool 300 includes an interface 380.

Rechargeable battery pack 100 illustrated in FIG. 1 is configured as a slide rechargeable battery pack, and includes an interface 180 that corresponds to interface 380 of hand-held power tool 300. As an alternative to the slide rechargeable battery pack, a configuration as a twist-off or swivel-out rechargeable battery pack is possible, and rechargeable battery pack 100 may be releasably locked on the side opposite from the swivel axis by snapping on, screwing, clamping, or bracing to housing 305 of hand-held power tool 300. It is thus possible to effectively prevent the rechargeable battery pack from falling out of housing 305.

For detachably mounting rechargeable battery pack 100 on a hand-held power tool 300 or on a charging device, rechargeable battery pack 100 includes an interface 180 for establishing a detachable mechanical and electrical connection to a corresponding interface 380 of hand-held power tool 300 or to a corresponding interface of the charging device. During mounting of rechargeable battery pack 100, a receiving arrangement, for example guide grooves and guide ribs, of hand-held power tool 300 or of the charging device are brought into engagement with the corresponding guide elements of rechargeable battery pack 100 in order to accommodate same, rechargeable battery pack 100 being inserted along the receiving arrangement, and interface 180 of rechargeable battery pack 100 being pushed into corresponding interface 380 of hand-held power tool 300 or the corresponding interface of the charging device. Rechargeable battery pack 100 may be associated with hand-held power tool 300 and/or the charging device via interfaces 180, 380.

Figure 2:
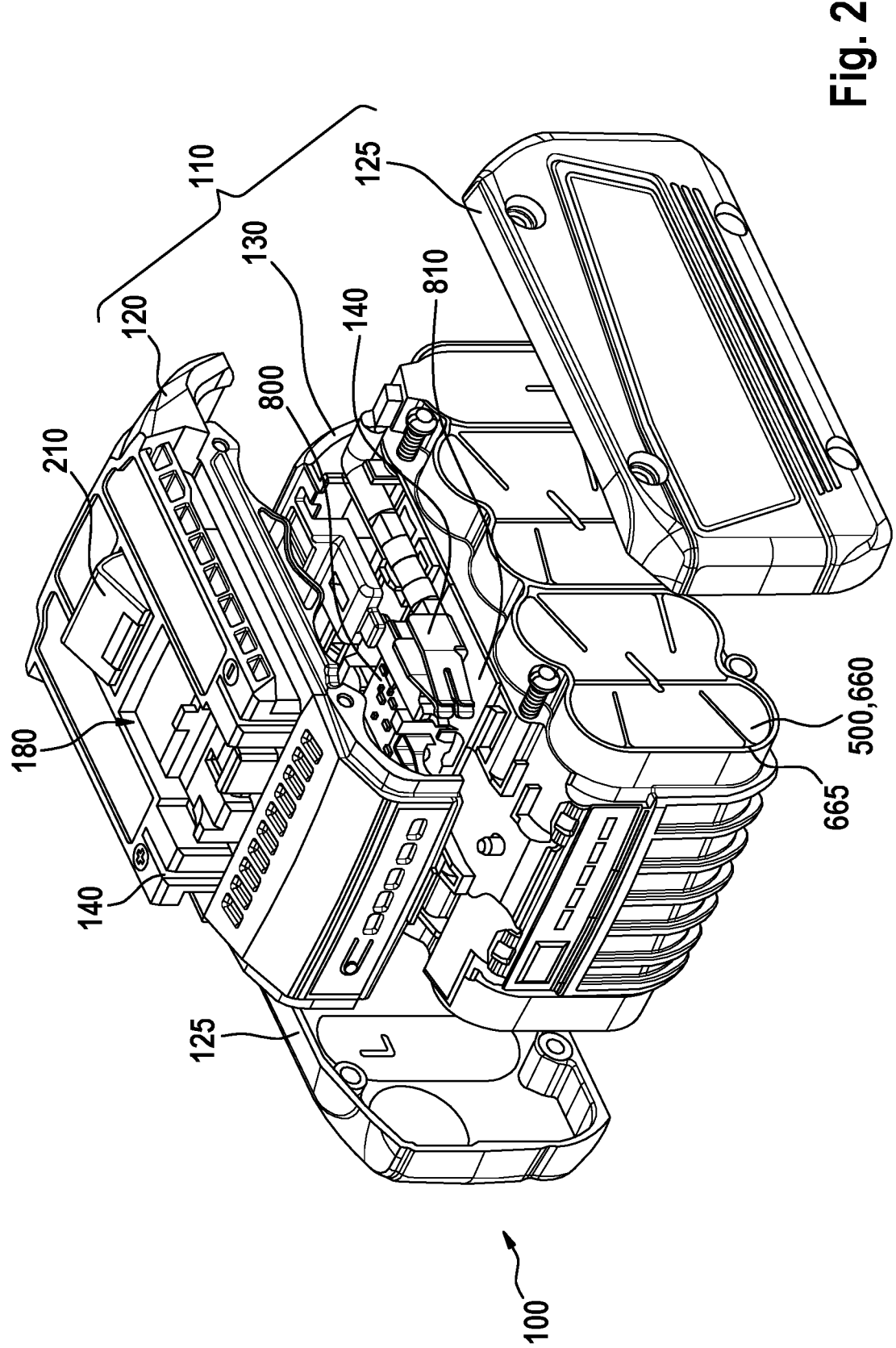
FIG. 2 shows a perspective exploded illustration of a first specific embodiment of a rechargeable battery pack according to the present invention.

As is apparent in FIG. 2, interface 180 also includes contact elements 140 for electrically contacting rechargeable battery pack 100 with hand-held power tool 300 or the charging device. Contact elements 140 are configured either as voltage contact elements that are used as charging and/or discharging contact elements, or as signal contact elements that allow signal transmission from rechargeable battery pack 100 to hand-held power tool 300 or to the charging device, and/or from hand-held power tool 300 or the charging device to rechargeable battery pack 100.

To lock rechargeable battery pack 100 on handle 315 of hand-held power tool 300, rechargeable battery pack 100 is pushed along handle 315, in particular along a lower outer surface of handle 315 that is oriented essentially perpendicularly with respect to longitudinal direction y of handle 315. In the position shown in FIG. 1, rechargeable battery pack 100 is locked on handle 315 by the locking arrangement. The locking arrangement include, among other things, a locking element 210, illustrated in FIG. 2, and an actuating element 220. Rechargeable battery pack 100 may be released from handle 315 of hand-held power tool 300 by actuating actuating arrangement 220. After rechargeable battery pack 100 is unlocked, it may be removed from handle 315. During mounting of rechargeable battery pack 100 on a hand-held power tool 300, locking element 210 is brought into engagement with a corresponding recess (not shown in greater detail) in handle 315 of hand-held power tool 300.

FIG. 2 shows a rechargeable battery pack 100 in an exploded illustration. Rechargeable battery pack 100 includes a housing 110 made up of a first housing component 120 and a second housing component 130. It is clearly apparent here that rechargeable battery pack housing 110 also includes a cell holder 600 with a plurality of rechargeable battery cells 400, not illustrated in greater detail, connected in series, second housing component 130 directly forming cell holder 600. Cell holder 600 is positioned between the two housing components 120, 130. Rechargeable battery pack housing 110 also includes two side components 125 which in the assembled state hold first housing component 120 and second housing component 130, i.e., cell holder 600, together in such a way that removal of first housing component 120 from second housing component 130, or conversely, is prevented. In the embodiment variant illustrated in FIG. 2, rechargeable battery pack 100 is configured as a slide rechargeable battery pack. Cell holder 600, in addition to fixing rechargeable battery cells 400 in rechargeable battery pack housing 120, 130, is also used for cooling rechargeable battery cells 400, and is made of a thermally conductive material such as aluminum or a plastic.

As is apparent in FIG. 2, cell holder 600 also includes sleeve-like insulation walls, so that the individual rechargeable battery cells 400 are separated and electrical insulation of the individual rechargeable battery cells 400 from one another may be ensured. The individual rechargeable battery cells 400 are accommodated at a distance from one another for mechanical fixing in cell holder 600. In the illustrated specific embodiment, each rechargeable battery cell 400 has a circumferential surface that extends in parallel to a longitudinal axis x, the circumferential surface being delimited by two end faces, perpendicular to longitudinal axis x, at which the electrical poles of rechargeable battery cells 400 are situated. The heat transfer resistance between adjacent rechargeable battery cells 400 and between rechargeable battery cells 400 and cell holder 600 may be low, so that the heat loss generated by rechargeable battery cells 400 is well dissipated to the outside, and overheating of the rechargeable battery pack in the interior may be prevented.

The connection of rechargeable battery cells 400 to one another may be achieved via cell connectors 500, as depicted. Rechargeable battery cells 400 may be electrically wired to one another in a parallel and/or series connection via cell connectors 500. Although not illustrated in greater detail in the figures, it is advantageous when cell connectors 500 have a large enough surface that, in addition to their function of ensuring electrical wiring of rechargeable battery cells 400 to one another in a parallel and/or series connection, they may also take on the function of a heat expansion element 660 and assist with the desired heat transfer.

Figure 3:
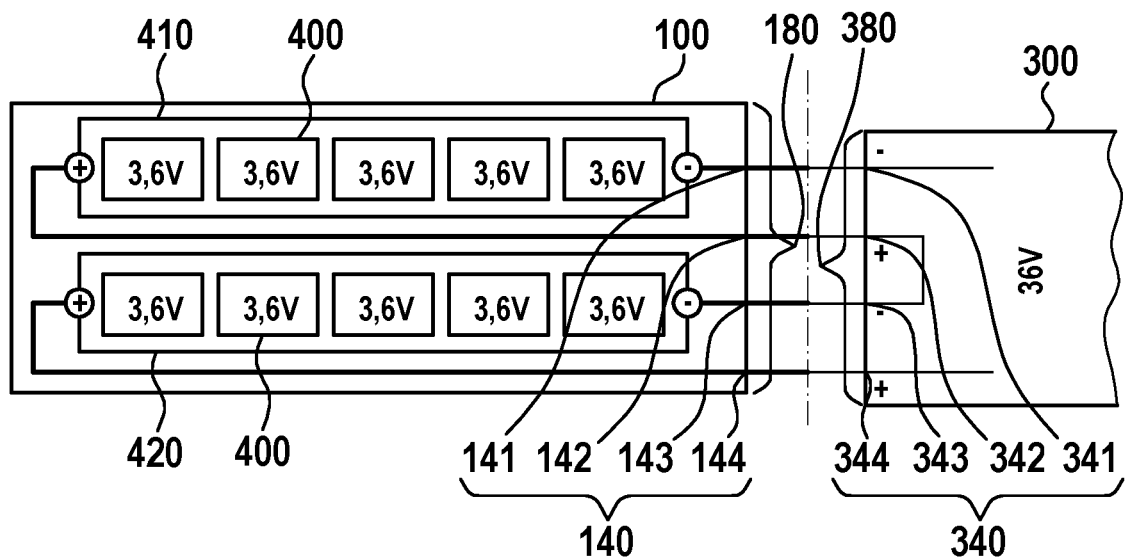
FIG. 3 shows a schematic sectional view of a connection between a rechargeable battery pack according to the present invention and an interface of a first hand-held power tool.
Figure 4:
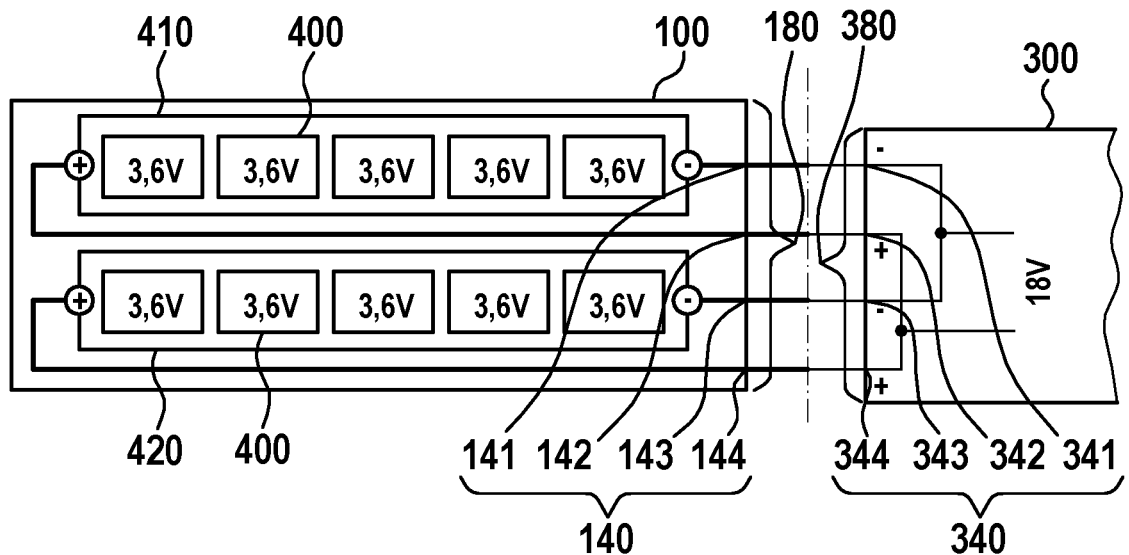
FIG. 4 shows a schematic sectional view of a connection between a rechargeable battery pack according to the present invention and an interface of a second hand-held power tool.

As illustrated in FIGS. 3 and 4, rechargeable battery pack housing 110 includes a first rechargeable battery cell string 410 and a second rechargeable battery cell string 420. In the illustrated specific embodiment, both rechargeable battery cell strings 410, 420 each include five rechargeable battery cells 400 that are electroconductively connected in series with a nominal voltage of 3.6 volts each. In principle, the number of rechargeable battery cells 400 connected in series is variable, it may be provided, as illustrated, for first rechargeable battery cell string 410 and second rechargeable battery cell string 420 to accommodate the same number of rechargeable battery cells 400. It may thus be ensured that the nominal voltage to be provided is a multiple of the respective voltages of first rechargeable battery cell string 410 and of second rechargeable battery cell string 420, so that the operating voltage required by hand-held power tool 300 is present when rechargeable battery pack 100 is inserted. In addition, interface 180 of rechargeable battery pack 100 includes two electrical contact elements 140 for each rechargeable battery cell string 410, 420. A first contact element 141 and a second contact element 142 are associated with first rechargeable battery cell string 410, and a third contact element 143 and a fourth contact element 144 are associated with second rechargeable battery cell string 420. First rechargeable battery cell string 410 and second rechargeable battery cell string 420 are situated within rechargeable battery pack housing 110 electrically insulated from one another. In addition, when rechargeable battery pack 100 is inserted, first rechargeable battery cell string 410 and second rechargeable battery cell string 420 are electroconductively connected to one another in a parallel or a series connection in such a way that the voltage required by hand-held power tool 300 is present. Similarly, interface 380 of hand-held power tool 300 includes in each case a number, for example four as in FIGS. 3 and 4, of countercontact elements 340 that in principle corresponds to the number of contact elements 140 of rechargeable battery pack 100 for electrically and/or mechanically contacting contact elements 140 of rechargeable battery pack 100. Countercontact elements 340 are wired together in such a way that drive motor 335 is supplied with the required voltage when a rechargeable battery pack 100 according to the present invention is inserted. The voltage required by hand-held power tool 300 corresponds to a multiple of the voltage provided by rechargeable battery cell strings 410, 420.

In the embodiment variant illustrated in FIG. 3, rechargeable battery cells 400 of first rechargeable battery cell string 410 and of second rechargeable battery cell string 420 are connected to one another in series. Electrical countercontact elements 340 of hand-held power tool 300 are connected to one another in such a way that second countercontact element 342 is connected to third countercontact element 343 in hand-held power tool 300, as a result of which the two rechargeable battery cell strings 420, 410 are connected in series, and a total voltage that is the sum of the two string voltages is present between first countercontact element 341 and fourth countercontact element 344.

Drive motor 335 is connected to first and fourth countercontact elements 341, 344 via an electronics system 370.

In the embodiment variant illustrated in FIG. 4, rechargeable battery cells 400 of first rechargeable battery cell string 410 and of second rechargeable battery cell string 420 are connected in parallel. Electrical countercontact elements 340 of hand-held power tool 300 are connected to one another in such a way that first countercontact element 341 is connected to third countercontact element 343, and second countercontact element 342 is connected to fourth countercontact element 344, when a rechargeable battery pack 100 is inserted. The nominal operating voltage of hand-held power tool 300 is then tapped between connected first and third countercontact elements 341, 343 and connected second and fourth countercontact elements 342, 344.

In principle, it is advantageous when cell holder 600, as illustrated FIG. 2, in areas forms an outer side of rechargeable battery pack housing 110, in particular second housing component 130. In addition, it is advantageous when side components 125 are made of the same material as the rest of rechargeable battery pack housing 110, which may be a synthetic, technically usable thermoplastic plastic such as a polyamide. Not illustrated but conceivable in principle is one embodiment variant of rechargeable battery pack 100 with a cell holder 600 that directly forms the at least one first rechargeable battery cell string 410 and/or the at least one second rechargeable battery cell string 420. In this way, costs may be reduced and the installation effort may be kept low. Alternatively, side components 125 may be made at least partially of a metal, which may be an aluminum or magnesium die casting, in which case a sufficient or reliable insulation insert, for example an elastic, heat-conducting element 650, must be used between cell connectors 500 and side components 125.

Although the present invention has been explained in greater detail with reference to the exemplary embodiments, those skilled in the art may also provide other combinations of the stated features without departing from the scope of protection of the present invention.

What is claimed is:

1. A hand-held power tool, comprising:
a drive motor situated in a housing for driving a mechanical interface;
an electronics system situated in the housing; a rechargeable battery pack that is detachably connectable to the hand-held power tool; and
an interface with countercontact elements for electrically and/or mechanically contacting contact elements of the rechargeable battery pack, wherein the interface includes at least four electrical countercontact elements, the countercontact elements being wired together so that the drive motor is supplied with the required voltage when the rechargeable battery pack is inserted;
wherein the rechargeable battery pack for the hand-held power tool includes:
a rechargeable battery pack housing, the rechargeable battery pack housing accommodating at least two rechargeable battery cells; and
a battery pack interface for establishing a mechanical and electrical connection of the rechargeable battery pack to the hand-held power tool and/or a charging device;
wherein the battery pack interface includes the contact elements for electrically and/or mechanically contacting corresponding countercontact elements on the hand-held power tool and/or corresponding countercontact elements on the charging device, and
wherein the rechargeable battery pack housing includes at least one first rechargeable battery cell string for accommodating multiple first rechargeable battery cells, that are electroconductively connected to one another in series, and at least one second rechargeable battery cell string for accommodating multiple second rechargeable battery cells that are electroconductively connected to one another in series, the rechargeable battery pack housing including at least two electrical contact elements for each rechargeable battery cell string.

2. The hand-held power tool of claim 1, wherein the number of contact elements of the interface of the rechargeable battery pack corresponds at least to the number of countercontact elements of the interface of the hand-held power tool.

3. The hand-held power tool of claim 1, wherein the operating voltage of the hand-held power tool is a multiple of the voltage provided by at least one of the first and second rechargeable battery cell strings.

4. The hand-held power tool of claim 1, wherein a first countercontact element of the hand-held power tool is connected to a third countercontact element of the hand-held power tool, and/or a second countercontact element of the hand-held power tool is connected to a fourth countercontact element of the hand-held power tool, when the rechargeable battery pack is inserted,
wherein the drive motor is connected to the first and the third countercontact elements and/or to the second and the fourth countercontact elements via the electronics system.

5. The hand-held power tool of claim 1, wherein a second countercontact element of the hand-held power tool is connected to a third countercontact element of the hand-held power tool when the rechargeable battery pack is inserted, the drive motor being connected to the first and the fourth countercontact elements.

6. A charging device for charging a rechargeable battery pack, comprising:
an interface with countercontact elements for electrically and/or mechanically contacting contact elements of the rechargeable battery pack, wherein the interface includes at least four electrical countercontact elements, the countercontact elements being wired to one another so that all rechargeable battery cells in the rechargeable battery pack are charged when the rechargeable battery pack is electrically connected to the charging device;
wherein the rechargeable battery pack includes:
a rechargeable battery pack housing, the rechargeable battery pack housing accommodating at least two rechargeable battery cells; and
a battery pack interface for establishing a mechanical and electrical connection of the rechargeable battery pack to a hand-held power tool and/or the charging device;
wherein the battery pack interface includes the contact elements for electrically and/or mechanically contacting corresponding countercontact elements on the hand-held power tool and/or corresponding countercontact elements on the charging device, and
wherein the rechargeable battery pack housing includes at least one first rechargeable battery cell string for accommodating multiple first rechargeable battery cells, that are electroconductively connected to one another in series, and at least one second rechargeable battery cell string for accommodating multiple second rechargeable battery cells that are electroconductively connected to one another in series, the rechargeable battery pack housing including at least two electrical contact elements for each rechargeable battery cell string.

7. the charging device of claim 6, wherein the number of the countercontact elements of the interface of the charging device corresponds to the number of contact elements of the interface of the rechargeable battery pack.

8. The hand-held power tool of claim 1, wherein the electronics system is configured to recognize and/or control the rechargeable battery pack that is connected via the interface of the hand-held power tool.

9. The hand-held power tool of claim 1, wherein the at least one first rechargeable battery cell string and the at least one second rechargeable battery cell string each include five rechargeable battery cells that are electroconductively connected in series to one another.

10. The hand-held power tool of claim 1, wherein the at least one first rechargeable battery cell string and the at least one second rechargeable battery cell string each include ten rechargeable battery cells that are electroconductively connected in series to one another.

11. The hand-held power tool of claim 1, wherein the at least one first rechargeable battery cell string and the at least one second rechargeable battery cell string are situated within the rechargeable battery pack housing electrically insulated from one another.

12. The hand-held power tool of claim 1, wherein, when the rechargeable battery pack is inserted, the at least one first rechargeable battery cell string and the at least one second rechargeable battery cell string are electroconductively connected to one another in a parallel or series connection so that the operating voltage required by the hand-held power tool is present.

13. The hand-held power tool of claim 1, wherein the rechargeable battery pack housing includes at least one cell holder for accommodating the at least one first rechargeable battery cell string and/or the at least one second rechargeable battery cell string.

14. The hand-held power tool of claim 13, wherein the cell holder directly forms the at least one first rechargeable battery cell string and/or the at least one second rechargeable battery cell string.

15. The charging device of claim 6, wherein the at least one first rechargeable battery cell string and the at least one second rechargeable battery cell string each include five rechargeable battery cells that are electroconductively connected in series to one another.

16. The charging device of claim 6, wherein the at least one first rechargeable battery cell string and the at least one second rechargeable battery cell string each include ten rechargeable battery cells that are electroconductively connected in series to one another.

17. The charging device of claim 6, wherein the at least one first rechargeable battery cell string and the at least one second rechargeable battery cell string are situated within the rechargeable battery pack housing electrically insulated from one another.

18. The charging device of claim 6, wherein, when the rechargeable battery pack is inserted, the at least one first rechargeable battery cell string and the at least one second rechargeable battery cell string are electroconductively connected to one another in a parallel or series connection so that the operating voltage required by the hand-held power tool is present.

19. The charging device of claim 6, wherein the rechargeable battery pack housing includes at least one cell holder for accommodating the at least one first rechargeable battery cell string and/or the at least one second rechargeable battery cell string.

20. The charging device of claim 19, wherein the cell holder directly forms the at least one first rechargeable battery cell string and/or the at least one second rechargeable battery cell string.

* * * * *